United States Patent

[11] 3,602,200

| [72] | Inventors | Grover C. Evans;<br>Thomas J. Evans, both of Little Rock, Ark. |
|---|---|---|
| [21] | Appl. No. | 28,811 |
| [22] | Filed | Apr. 15, 1970 |
| [45] | Patented | Aug. 31, 1971 |
| [73] | Assignee | G. C. Evans Products Corporation<br>Little Rock, Ark. |

[54] INSTANTANEOUS SANITIZING WATER HEATING UNIT
6 Claims, 8 Drawing Figs.

| [52] | U.S. Cl. | 122/264, 122/406 R |
|---|---|---|
| [51] | Int. Cl. | F22b 15/00 |
| [50] | Field of Search | 122/262, 264, 359, 406 R |

[56] References Cited
UNITED STATES PATENTS

| 1,855,833 | 4/1932 | Hirzel | 122/264 |
| 2,079,546 | 5/1937 | Conekin | 122/264 |

*Primary Examiner*—Kenneth W. Sprague
*Attorney*—Davis, Lucas, Brewer and Brugman ABSTRACT: A water heater for heating large amounts of water quickly. Water moves back and forth in rows of horizontal, heated tubes, reversing direction in plenum compartments and moving in a generally downward direction, countercurrent to burner gases rising from firebox. Cold water enters through a pressure-reducing valve, into three or more rows of heater tubes in parallel and progressively passes through reducing numbers of tubes to thereby progressively increase water velocity and turbulence, decrease nonmoving film thickness, and increase heat conductivity to a maximum in the high heat zone adjacent the firebox.

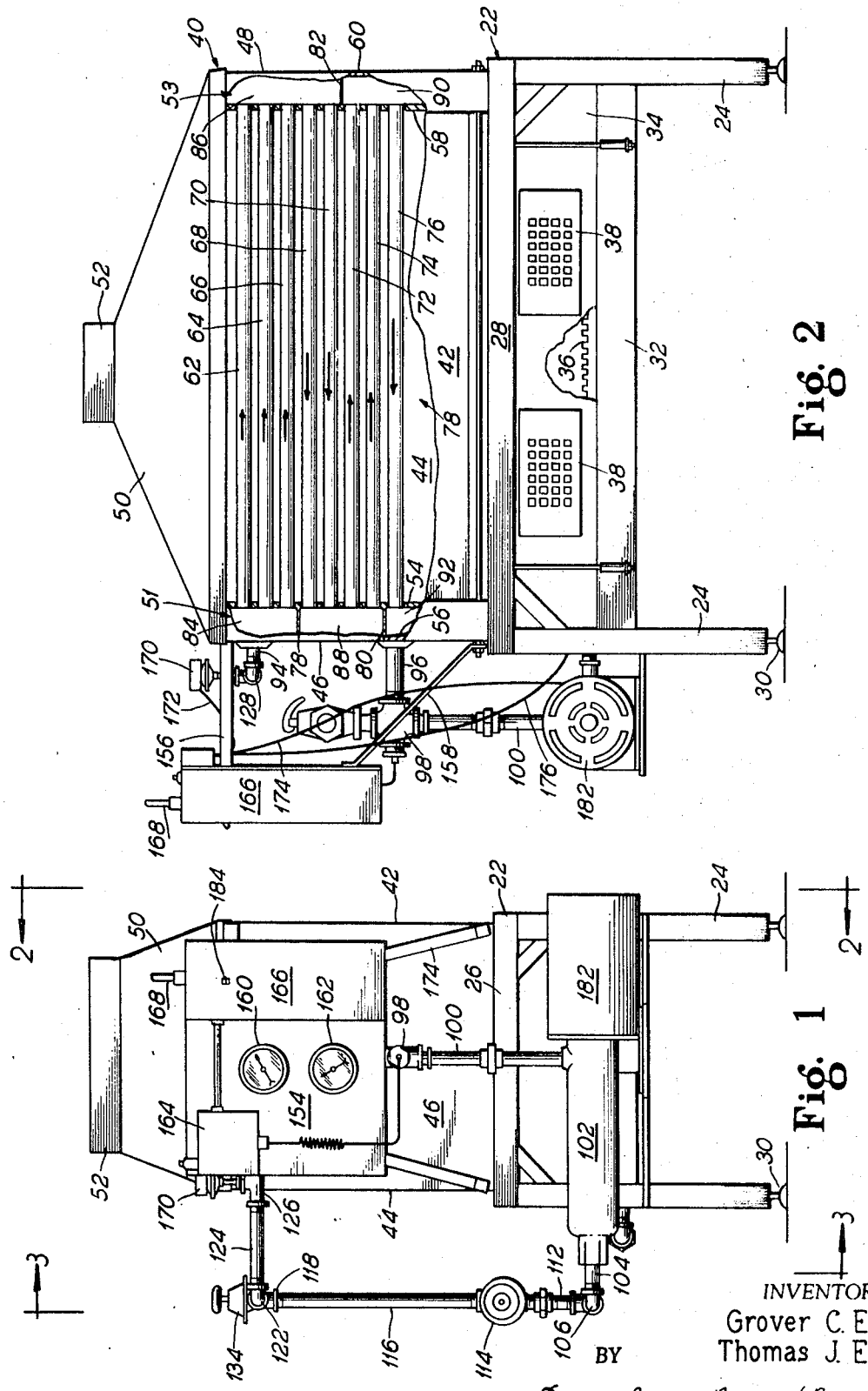

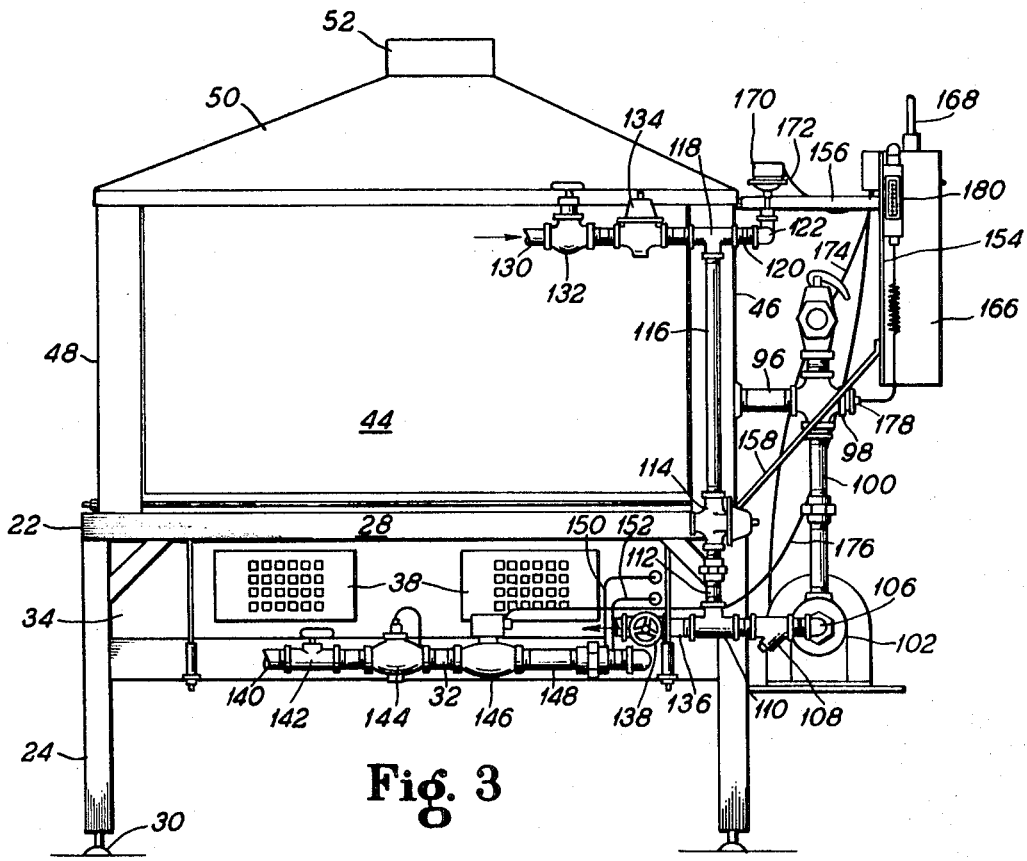
Fig. 3
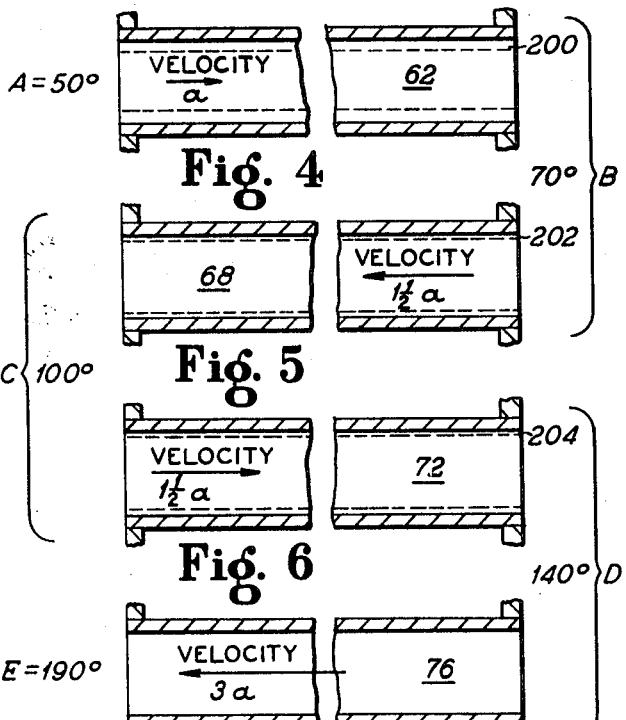
Fig. 4
Fig. 5
Fig. 6
Fig. 7
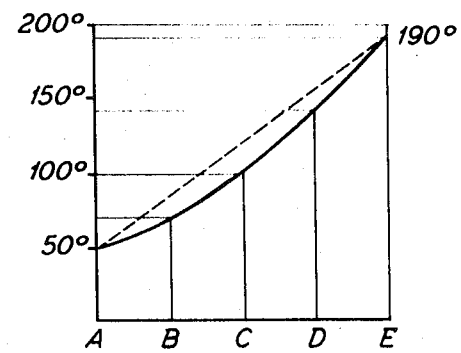
Fig. 8
INVENTORS
Grover C. Evans
Thomas J. Evans
BY
Davis, Lucas, Brewer & Brugman
ATTORNEYS

INSTANTANEOUS SANITIZING WATER HEATING UNIT

BACKGROUND OF THE INVENTION

In recent years, the soft drink and dairy industries have become very conscious of sanitizing methods utilizing large quantities of water heated to 190° F. and higher. This is used in various process and cleanup applications in carbonated beverage plants, dairies, food processing plants and others, where the water is mixed with detergent for cleaning floors, syrup and processing tanks and equipment, and for sterilizing syrup lines, milk piping, tank trucks, bottles, cartons and carrying cases, etc.

SUMMARY OF THE INVENTION

The present invention provides an instantaneous sanitizing water heating unit which can heat large quantities of water quickly to 190° F. or more with a minimum of thermal shock and stress corrosion in the heating tubes.

An important feature is progressively increasing the lineal velocity and turbulence of water as it passes through tubes in the hotter zones in the heat exchanger, for the best heat transfer efficiency and rapid heating.

BRIEF DESCRIPTION OF THE DRAWING

FIG. 1 is an end view of a water heating unit illustrating a preferred embodiment of the invention;

FIG. 2 is a right side view of FIG. 1, taken in the direction of the arrows 2—2;

FIG. 3 is a left side view of FIG. 1, taken in the direction of the arrows 3—3;

FIG. 4 is a view of an upper heat tube where cold water enters, and showing the relatively slow lineal velocity and relatively thick insulating film of nonmoving water on the inside wall of the tube;

FIGS. 5 and 6 are views similar to FIG. 4, showing later-stage heat or water tubes where the lineal velocity and turbulence of the water is increased and the heat insulating layer is reduced to improve heat transfer efficiency;

FIG. 7 is a final heat tube showing maximum water velocity and minimum film thickness in the hottest part of the heat exchanger; and FIG. 8 is a chart showing progressive heating of water as it passes through the heat exchanger.

DESCRIPTION OF THE PREFERRED EMBODIMENT

The unit shown in the drawing includes a base 22 having legs 24 and end and side frame channels 26 and 28. Each leg has a crew-type leveling pad 30 bearing on the ground or floor. The base supports a firebox or burner compartment generally designated 32 comprising a pan housing 34 cut away in FIG. 2 to show one of the burners 36. Air vent gratings 38 provide air input to the burners.

A heating section or heat exchanger 40 has continuous sidewalls 42, 44 and end walls 46, 48 upstanding from the base 22. It has an open bottom in heat-receiving communication with the firebox, and a circuit or cover 50 topped by a flue 52 which in use will be connected to a chimney or other heat exhaust pipe.

Each front end wall 46 comprises a pair of inner and outer horizontally spaced vertical plates 54 and 56. As a result of their horizontal spacing, they define a forward water plenum 51 between them. Similarly, rear end wall 48 comprises a pair of inner and outer horizontally spaced vertical plates 58 and 60 defining a rear water plenum 53 between them.

Eight vertically spaced rows of horizontal water tubes 62, 64, 66, 68, 70, 72, 74 and 76, extend through the heating zone 78 in the heat exchanger. Opposite ends of these water tubes extend through the two inner vertical plates 54, 58 and provide communication between plenums 51 and 53. The plenums are vertically divided by horizontal separators 78, 80 and 82 into a series of plenum compartments 84, 86, 88, 90 and 92.

Water flows in a generally downward direction, countercurrent to the heated gases rising from the burner 36 as follows. A cold water input line 94 conducts tap water, for instance, into the upper, inlet plenum compartment 84 and to the right (FIG. 2) through tubes 62, 64, 66 into plenum compartment 86. The flow here makes a 180° turn and reverses through tubes 68, 70 into plenum 88. As a second reversal, the flow passes through tubes 72, 74 into plenum 90 and thence through tube 76 into outlet plenum compartment 92.

It will be understood that each of the tubes 62 through 76 shown in FIG. 2 is actually one of a row of horizontal water tubes extending between sidewalls 42, 44. Flow from plenum 92 exits into a recycle conduit which may be traced as follows: Pipe 96, cross 98, vertical pipe 100, pump 102, pipe 104, elbow 106, cleanout fitting 108, tee 110, vertical pipe 112, pump output pressure regulator 114, vertical pipe 116, tee 118, nipple 120, elbow 122 (FIG. 3), horizontal pipe 124 (FIG. 1), tee 126, elbow 128, nipple 94, and thence into inlet plenum 84.

Makeup water enters through a line 130, a shutoff valve 132, a water pressure regulator 134, and thence through tee 118 into the recycle line just described.

A hot water output conduit 136 is connected to the pump outlet through tee 110, and a shutoff valve 138 controls the hot water output to a line not shown.

In the present case, the burners are fueled by gas entering through line 140, shutoff valve 142, pilot control valve 144, automatic gas valve 146, and line 148, into burners 36.

The gas combustion and control system may be conventional so will not be described here in detail. Briefly, a pair of pilot light supply lines 150, 152 connect pilots for burners 36 inside the firebox 32, and if one of these pilots (not shown) is extinguished, the pilot control valve 144 closes off the entire supply of gas.

An indicator panel 154 is mounted by brackets 156 and 158 to the front of the unit. The panel 154 supports a pressure gauge 160, a thermometer 162, a thermostat control box 164, and an electrical and starting control box 166. A power supply line 168 enters at the top of the latter. A water pressure switch 170 which, in the recycle conduit, senses the presence or absence of pressure in the water system and may, if desired, through lines 172 and 176, close automatic gas valve 146 if the pressure drops below a minimum considered safe. A system such as this should never run the burners while the water tubes are dry, and one of the safeguards against such contingency is to shut the burners off automatically if the water pressure ever drops too low.

A temperature sensing element 178 in cross 98 monitors the temperature of the hot water output set by the thermostat 180. When the temperature reaches the set value, automatic gas valve 146 will shut off the gas to the burners in response to a signal through line 176.

A motor 182 drives the pump 102, the motor being controlled through line 174 by starting switch 184 on control box 166.

An important part of the invention which minimizes thermal shock and stress corrosion in the heating tubes, yet enables the water heatup to be instantaneous, is the arrangement of water heating tubes and plenum compartments.

The arrangement is such that, as the water flows in a generally downward direction through the tubes, countercurrent to the heated gases rising from the burners 36, the water stream will have a progressively fewer number of tubes to pass through and hence will increase in lineal velocity and turbulence, decreasing the insulating film inside the tubes and increasing heat conductivity until the stream reaches the maximum heat zone at the firebox outlet.

As shown in FIG. 2, rows of tubes 62, 64, 66, are first-pass tubes where the velocity is shown by relatively short arrows. Tubes 68, 70, are second-pass tubes in which the same flow handles by three tubes is now concentrated in two tubes and the velocity is somewhat increased as indicated by the additional length of the arrows in FIG. 2. Tubes 72, 74, are third-pass tubes with the lineal velocity the same as in the second-pass, and tubes represented by the bottom row 76 are fourth- or lastpass tubes in which the entire water flow is concentrated in one row of tubes for maximum velocity as indicated by the long arrow in FIG. 2.

Representative of these four passes are tubes 62, 68, 72 and 76, shown in FIGS. 4 through 7. These show, in somewhat exaggerated form, the thickness of the stagnant film of flow (water), which is an effective insulating barrier, reducing heat transfer, and is always thicker in lines where the flow is slow and laminar as contrasted with fast and turbulent.

Referring to FIGS. 4 through 7, if the water velocity in line 62 is represented by the letter $a$, the velocity in tubes 68 and 72 will be $1\frac{1}{2}a$ and the velocity in tube 76 will be $3a$. Note that the film 200 in FIG. 4 is of substantial thickness compared with films 202 and 204 in FIGS. 5 and 6. And in FIG. 7, due to the high velocity turbulence and scrubbing action of hot water in the final pass, the film will be substantially nonexistent.

By constructing the unit so the film has substantial thickness in the first pass (tubes 62, 64, 66), the tubes and their supports will be protected from the sudden shock of cold water entering the heated tubes.

FIG. 8 shows a chart of the temperatures entering at 50° in inlet plenum compartment 84 and exiting at 190° in outlet plenum compartment 192, showing the progressive but gradual acceleration in temperature build up. As shown in this hypothetical example, temperature rise is only from 50° to 70° in the first pass, from 70° to 100° in the second pass, from 100° to 140° in the third pass, and from 140° to 190° in the fourth pass. Thus, the first pass increases the temperature only 20° and the last pass increases the temperature only 50°.

An important part of the present invention is in the use of pressure regulators 114 and 134. As one example, the pressure regulator 134 may be set to feed makeup water only when the pressure in inlet plenum compartment 84 is reduced to 10 pounds per square inch. And likewise, the pressure regulator 114 may be set at 10 p.s.i. to prevent the full pump pressure entering the water tubes.

This enables full sanitizing water heater unit pressure, as much as 100 p.s.i. to on the output applied of the pump the outlet line through valve to limit yet keeps the pressure in the water tubes down to an advantageous low value.

In operation, the water will be constantly recycled through the tubes by the pump, with the burner going on and off automatically as required to maintain the temperature set by the thermostat 180.

The recycled hot water serves a very valuable function of tempering the cold water inlet from the makeup.

With the electrical supply connected into the switch box 166 through line 168, the startup operation would be as follows. Open the gas shutoff valve 142 and light the pilots. Open water valve 132 and fill the system with cold makeup water, turn on starting switch 184 which opens the automatic gas valve 146, and turns on the pump motor 182. When the discharge water reaches the desired temperature, the output valve 138 is opened and the system is ready for use.

I claim as my invention:

1. I claim instantaneous sanitizing water heating unit comprising:
   a. a base;
   b. an air-vented firebox supported on said base;
   c. a heat exchanger having continuous side and end walls upstanding from said base above said firebox, an open bottom in heat-receiving communication with the firebox, and a cover topped by a flue;
   d. an opposed pair of said walls each of which comprises a pair of inner and outer horizontally spaced vertical plates defining a water plenum between each pair of plates;
   e. a plurality of vertically spaced rows of horizontal water tubes extending through a heating zone between the two inner plates and providing communication between said water plenums;
   f. each plenum being vertically divided by horizontal separators into a series of plenum compartments enabling flow of water from an upper, inlet plenum compartment to a lower, outlet plenum compartment in a series of back and forth flows through progressively decreasing numbers of said tubes to progressively increase the velocity and turbulence of water in the tubes from the top to the bottom of the heat exchanger;
   g. a recycle conduit containing a water pump having its inlet and outlet connected respectively to said outlet and inlet plenum compartments;
   h. a cold water makeup input conduit connected to said inlet plenum compartment;
   i. makeup water valve control means in said input conduit;
   j. a hot water output conduit connected to said pump outlet;
   k. output water valve control means in said output conduit;
   l. combustion means in said firebox; and
   m. means for controlling said combustion means in response to temperature of the heated water.

2. An instantaneous sanitizing water heater unit according to claim 1 in which the cold water makeup water valve control means includes a pressure-reducing valve automatically effective to admit makeup water to the inlet plenum compartment in response to pressure drop in said inlet plenum compartment to a predetermined minimum.

3. An instantaneous sanitizing water heater unit according to claim 1 in which said recycle conduit on the output side of the pump contains a pressure-reducing valve effective to limit the maximum pressure of water recycled by the pump to the inlet plenum compartment.

4. An instantaneous sanitizing water heater unit according to claim 3 in which the hot water output conduit is connected to the recycle conduit between the pump outlet and the pressure-reducing valve.

5. An instantaneous sanitizing water heater unit according to claim 1 in which the inlet plenum compartment is connected to at least three vertically spaced rows of water tubes and the outlet plenum compartment is connected to only one such row of water tubes.

6. An instantaneous sanitizing water heater unit according to claim 1 in which there are at least eight vertically spaced rows of water tubes and water makes four over and back passes through the heating zone between plenums, the first pass being through at least three such rows in parallel, the second and third passes being through two or more such rows, and the fourth pass being through a single such row.

PO-1050
(5/69)

UNITED STATES PATENT OFFICE
CERTIFICATE OF CORRECTION

Patent No. __3,602,200__   Dated __August 31, 1971__

Inventor(s) __Grover C. Evans and Thomas J. Evans__

It is certified that error appears in the above-identified patent and that said Letters Patent are hereby corrected as shown below:

Column 1, line 51, "crew-type" should read --screw type--.
Column 2, line 72, "handles" should read --handled--.
Column 3, line 2, "lasthpass" should read --last-pass--; Lines 38-40, cancel "sanitizing water heater unit pressure, as much as 100 p.s.i. to on the output applied of the pump the outlet line through valve to limit" and substitute --pump pressure as much as 100 p.s.i. to be applied to the outlet through valve 138.--; and line 57, cancel "I claim" and substitute --An--.

Signed and sealed this 7th day of March 1972.

(SEAL)
Attest:

EDWARD M. FLETCHER, JR.
Attesting Officer

ROBERT GOTTSCHALK
Commissioner of Patents